(12) United States Patent
Soleymani et al.

(10) Patent No.: US 12,030,043 B2
(45) Date of Patent: Jul. 9, 2024

(54) PHOTOACTIVE PRODUCT COMPRISING A CATECHOL-CONTAINING COMPOUND AND A PHOTOELECTRODE COMPRISING SAME

(71) Applicant: MCMASTER UNIVERSITY, Hamilton (CA)

(72) Inventors: Leyla Soleymani, Oakville (CA); Igor Zhitomirsky, Dundas (CA); Amanda Victorious, Hamilton (CA); Amanda Clifford, Caledonia (CA)

(73) Assignee: MCMASTER UNIVERSITY, Hamilton (CA)

( * ) Notice: Subject to any disclaimer, the term of this patent is extended or adjusted under 35 U.S.C. 154(b) by 0 days.

(21) Appl. No.: 17/620,392

(22) PCT Filed: Jun. 19, 2020

(86) PCT No.: PCT/CA2020/050862
§ 371 (c)(1),
(2) Date: Dec. 17, 2021

(87) PCT Pub. No.: WO2020/252596
PCT Pub. Date: Dec. 24, 2020

(65) Prior Publication Data
US 2022/0347665 A1 Nov. 3, 2022

Related U.S. Application Data

(60) Provisional application No. 62/863,540, filed on Jun. 19, 2019.

(51) Int. Cl.
*B01J 35/39* (2024.01)
*B01J 21/06* (2006.01)
(Continued)

(52) U.S. Cl.
CPC ............. *B01J 35/39* (2024.01); *B01J 21/063* (2013.01); *B01J 31/062* (2013.01); *B01J 35/23* (2024.01)

(58) Field of Classification Search
None
See application file for complete search history.

(56) References Cited

U.S. PATENT DOCUMENTS

| 2007/0161095 A1* | 7/2007 | Gurin ..................... C12P 7/10 |
| | | 435/161 |
| 2015/0209808 A1* | 7/2015 | Watson ............... B05B 11/0005 |
| | | 222/113 |
| 2016/0012974 A1 | 1/2016 | Katagiri et al. |

FOREIGN PATENT DOCUMENTS

| CN | 106750399 B | 1/2019 |
| CN | 109125293 A | 1/2019 |

OTHER PUBLICATIONS

Bae, K. H. et al., Chitosan Oligosaccharide-Stabilized Ferrimagnetic Iron Oxide Nanocubes for Magnetically Modulated Cancer Hyperthermia, ACSNANO, (2012), vol. 6, pp. 5266-5273.
(Continued)

*Primary Examiner* — Stefanie J Cohen
(74) *Attorney, Agent, or Firm* — Dilworth IP, LLC

(57) ABSTRACT

This application relates to a photoactive product comprising: a catechol-containing compound, an amine-containing polymer, and photoactive material. The photoactive product can act as a photocatalyst and can be used in photoelectrodes for use in, for example, photoelectrochemical analyte sensing, including biosensing. The photoelectrodes modified with hybrid organic/inorganic materials can provide increased light absorption and charge separation, binding sites for attaching biorecognition probes, and built-in film-forming
(Continued)

properties for well-adhered and uniform photoactive frameworks on the collector electrodes.

27 Claims, 6 Drawing Sheets

(51) Int. Cl.
  *B01J 31/06* (2006.01)
  *B01J 35/23* (2024.01)

(56) References Cited

OTHER PUBLICATIONS

Clifford, A. et al, Biomimetically Modified Chitosan for Electrophoretic Deposition of Composites, Colloids and Surfaces A 544 (2018) pp. 28-34.
George, J. M. et al., Metal Oxide Nanoparticles in Electrochemical Sensing and Biosensing: A Review, Microchimica Acta, (2018), vol. 185, pp. 1-26.
Janković, I. A. et al., Surface Modification of Colloidal TiO2 Nanoparticles with Bidentate Benzene Derivatives, J. Phys. Chem. C, (2009), vol. 113, pp. 12645-12652.
Khan, R. et al., Electrochemical Studies of Novel Chitosan/TiO2 Bioactive Electrode for Biosensing Application, Electrochem. Commun., (2008), vol. 10, pp. 263-267.
Kim, K. et al., Bio-Inspired Catechol Conjugation Converts Water-Insoluble Chitosan into a Highly Water-Soluble, Adhesive Chitosan Derivative for Hydrogels and LbL Assembly, Biomater. Sci., (2013), Vo. 1, pp. 783-790.
Kim, E. et al., Biomimetic Approach to Confer Redox Activity to Thin Chitosan Films. Adv. Funct. Mater., (2010), vol. 20, pp. 2683-2694.
Kim, S. et al., TiO2 Complexed with Dopamine-Derived Polymers and the Visible Light Photocatalytic Activities for Water Pollutants, Journal of Catalysis, (2017), vol. 346, pp. 92-100.
Kim, E. et al., Amplified and in Situ Detection of Redox-Active Metabolite Using a Biobased Redox Capacitor, Anal. Chem., (2013), vol. 85, pp. 2102-2108.
Ni, K. et al., Magnetic Catechol-Chitosan with Bioinspired Adhesive Surface: Preparation and Immobilization of ω-Transaminase, PLoS One, (2012), vol. 7, pp. 1-8.
Norranattrakul, P. et al., Fabrication of Chitosan/Titanium Dioxide Composites Film for the Photocatalytic Degradation of Dye. J. Met. Mater. Miner., (2013), vol. 23, pp. 9-22.
Ryu, J. H. et al., Bio-Inspired Adhesive Catechol-Conjugated Chitosan for Biomedical Applications: A Mini Review, Acta Biomaterialia, (2015), vol. 27, pp. 101-115.
Sakib, S. et al., Surface Modification of TiO2 for Photoelectrochemical DNA Biosensors, Medical Devices & Sensors, (2019), pp. 1-10.
Saraswat, S. K. et al., Recent Advancements in Semiconductor Materials for Photoelectrochemical Water Splitting for Hydrogen Production Using Visible Light, Renew. Sustain. Energy Rev., (2018), vol. 89, pp. 228-248.
Shetti, N. P. et al., Nanostructured Titanium Oxide Hybrids-Based Electrochemical Biosensors for Healthcare Applications, Colloids and Surfaces B: Biointerfaces, (2019), vol. 178, pp. 385-394.
Winkler, T. E. et al., Electrochemical Study of the Catechol-Modified Chitosan System for Clozapine Treatment Monitoring, Langmuir, (2014), vol. 30, pp. 14686-14693.
Zvarec, O. et al., Catechol-Functionalized Chitosan/Iron Oxide Nanoparticle Composite Inspired by Mussel Thread Coating and Squid Beak Interfacial Chemistry, Langmuir, (2013), vol. 29, pp. 10899-10906.
International Preliminary Report on Patentability dated Dec. 30, 2021 in counterpart International Application No. PCT/CA2020/050862.

* cited by examiner

PHOTOACTIVE PRODUCT COMPRISING A CATECHOL-CONTAINING COMPOUND AND A PHOTOELECTRODE COMPRISING SAME

FIELD

The present application relates to a photoactive product, a photoelectrode comprising the photoactive product, and devices, such as biosensors, comprising the photoelectrode.

BACKGROUND

In photoelectrochemistry (PEC), light is used to generate charge carriers in the photoactive material to drive electrochemical reactions. The possibility to operate PEC cells in photovoltaic, photoelectrosynthetic, or photocatalytic modes enables them to be used in a wide range of applications such as energy conversion focused on water splitting and solar energy conversion, developing self-cleaning and environmental cleaning surfaces for removing bacterial and other organic contaminants, and biosensors for the detection of proteins and nucleic acids. Titanium dioxide ($TiO_2$) nanoparticles are used as the photoactive building blocks of electrodes in these PEC-enabled applications due to their high photocatalytic activity, photo and chemical stability, corrosion resistance, high degree of control over morphology and crystallinity, position of conduction and valence band levels for driving useful electrochemical reactions, insolubility in aqueous media, non-toxicity, and low cost. Nevertheless, $TiO_2$ is limited to absorption in the UV range. Additional steps such as sintering, addition of binders, mechanical compression, deposition of amorphous $TiO_2$ binder layers using post deposition sol-gel and chemical vapour deposition, and irradiation with microwave have been employed to incorporate $TiO_2$ nanoparticles into photoactive electrodes. These additional steps may result in the loss of porosity in the three-dimensional network of particles and add to the overall cost and complexity of the process. Other improved photoactive materials are still needed for use in photoelectrodes, for example.

The background herein is included solely to explain the context of the application. This is not to be taken as an admission that any of the material referred to was published, known, or part of the common general knowledge as of the priority date.

SUMMARY

In an aspect, there is provided a photoactive product comprising: a catechol-containing compound, an amine-containing polymer, and a photoactive material. With respect to the photoactive product, there is provided: in another aspect, wherein the catechol-containing compound is coupled to the amine-containing polymer to form a first product. In other aspects, wherein the photoactive material is functionalized with the first product. In other aspects, wherein the first product is a Schiff base, an amide, and/or a sulfonamide. In other aspects, wherein a catechol portion of the catechol-containing compound couples to the photoactive material. In other aspects, wherein the photoactive product is a Schiff base, an amide, and/or a sulfonamide. In other aspects, wherein the catechol-containing compound comprises a catechol-containing compound that has a functional group capable of reacting with the amine group of the amine-containing polymer. In other aspects, wherein the functional group is carbonyl groups, carboxyl groups, sulfonyl groups, amine groups, alkenyl groups, alkynyl groups, or combinations thereof. In other aspects, wherein the catechol-containing compound is selected from 3,4-dihydroxybenzaldehyde (DHB), 3,4-dihydroxyphenylalanine (DOPA), 3,4-dihydroxybenzoic acid (DHBA), 3,4-dihydroxyphenylacetic acid (DHPAA), 3,4-dihydroxyhydrocinnamic acid (DHHCA), 4,5-dihydroxy-1,3-benzenedisulfonic acid (DHBSA), caffeic acid (CA), gallic acid (GA), dopamine (DA), 2,3,4-trihydroxybenzaldehyde (THB), 2,3,4-trihydroxybenzoic acid (THBA), or a combination thereof. In other aspects, wherein the catechol-containing compound is DHB. In other aspects, wherein the amine-containing polymer comprises a homopolymer or copolymer that has at least one amine group. In other aspects, wherein the average molecular weight of the amine-containing polymer ranges from about 1 kDa to about 1000 kDa or from about 10 kDa to about 500 kDa. In other aspects, wherein the amine-containing polymer comprises chitosan, polylysine, or combinations thereof. In other aspects, wherein the amine-containing polymer comprises chitosan. In other aspects, wherein the photoactive material comprises photoactive particles, nanomaterial, or a combination thereof. In other aspects, wherein the photoactive material comprises nanoparticles, microparticles, nanomaterial, or a combination thereof. In other aspects, wherein the photoactive material comprises nanoparticles, microparticles, nanowires, nanorods, nanostars, or a combination thereof. In other aspects, wherein the photoactive material comprises conductor and/or semiconductor materials. In other aspects, wherein the photoactive material comprises metal(s), metal oxide(s), semiconductor material(s), carbon-based material(s), conductive polymer(s), photoactive polymer(s), plasmonic material(s), dye(s), or a combination thereof. In other aspects, wherein the photoactive material comprises metal oxide(s), sulfide(s), metal chalcogenide, or a combination thereof. In other aspects, wherein the metal oxide(s) are selected from Cd, Zn, In, Pb, Mo, W, Sb, Bi, Cu, Hg, Ti, Ag, Mn, Fe, V, Sn, Zr, Sr, Ga, Si, Cr, a perovskite such as $SrTiO_3$ or $CaTiO_3$, or a combination thereof. In other aspects, wherein the sulfide(s) are selected from CdS, ZnS, $In_2S_3$, PbS, $Mo_2S$, $WS_2$, $Sb_2S_3$, $Bi_2S_3$, $ZnCdS_2$, $Cu_2S$, or a combination thereof. In other aspects, wherein the metal chalcogenide is selected from CdSe, $In_2Se_3$, $WSe_2$, HgS, PbSe, CdTe or a combination thereof. In other aspects, wherein the photoactive material comprises titanium dioxide, zinc oxide, iron oxide, cadmium sulfide, cadmium telluride, or a combination thereof. In other aspects, wherein the photoactive material comprises titanium dioxide. In other aspects, wherein the titanium dioxide has a crystal structure that is at least one of anatase, rutile and brookite. In other aspects, wherein the titanium dioxide is $P25-TiO_2$. In other aspects, wherein the catechol-containing compound and the amine-containing polymer are in a mole ratio of from about 1:1 to 5:1, from about 1:1 to 4:1, from about 1.5:1 to 4:1, from about 2:1 to 5:1, from about 2:1 to 4:1, from about 2:1 to 3:1, or from about 2:1. In other aspects, wherein the photoactive product has an enhancement in IPCE of at least about 50%, at least about 60%, at least about 70%, at least about 80%, or at least about 90% compared to unmodified photoactive material. In other aspects, wherein the photoactive product has enhanced film or layer forming properties and/or electronic properties compared to unmodified photoactive material. In other aspects, wherein the photoactive product synergistically enhances a generated photocurrent compared to unmodified photoactive material. In other aspects, wherein the photoactive product further comprises biomolecule(s) or synthetic analog(s). In other aspects, wherein the biomolecule(s) or synthetic analog(s) thereof are selected oligonucleotide(s), oligopeptide(s), antibodie(s), aptamer(s), DNAzyme(s), molecular imprinted polymer(s), oligosaccharide(s), or a combination thereof. In other aspects, wherein the biomolecule(s) comprise oligonucleotide(s). In other aspects, wherein the catechol-containing compound is coupled to the biomolecule(s) or synthetic analog(s) to form a second product. In other aspects, wherein the photoactive material is functionalized with the second product. In other aspects, wherein the second product is a Schiff base, an amide, and/or a sulfonamide. In other aspects, wherein the photoactive product is a photocatalyst.

In another aspect, there is provided a method for making a photoactive product as disclosed herein, the method comprising: combining the catechol-containing compound, the amine-containing polymer and the photoactive material to form the photoactive product.

In another aspect, there is provided a method for making a photoactive product disclosed herein, the method comprising: i) combining the catechol-containing compound and the amine-containing polymer to form the first product; and ii) combining the first product with the photoactive material to form the photoactive product.

In another aspect, there is provided a method for making a photoactive product disclosed herein, the method comprising: combining the catechol-containing compound, the amine-containing polymer, the biomolecule(s) or synthetic analog(s) and the photoactive material to form the photoactive product.

In another aspect, there is provided a method for making a photoactive product disclosed herein, the method comprising: i) combining the catechol-containing compound, the amine-containing polymer, and the biomolecule(s) or synthetic analog(s) to form the first product and the second product, wherein the first product comprises the catechol-containing compound and the amine-containing polymer and the second product comprises the catechol-containing compound and the biomolecule(s) or synthetic analog(s); and ii) combining the first product and the second product with the photoactive material to form the photoactive product. With respect to the method, there is provided: in another aspect, wherein there is a higher concentration of the catechol-containing compound compared to the amine-containing polymer and the biomolecule(s) or synthetic analog(s) in i). In other aspects, wherein the catechol-containing compound, the amine-containing polymer, and the biomolecule(s) or synthetic analog(s) thereof are in a mole ratio of from about 1:1:1 to 5:1:1, from about 2:1:1 to 5:1:1, from about 3:1:1 to 4:1:1, or from about 3:1:1.

In other aspects of the methods disclosed herein, wherein a solution of i) is combined with the photoactive material to form a suspension. In other aspects, wherein the method is a single-pot method.

In another aspect, there is provided a photoactive product made by the method disclosed herein.

In another aspect, there is provided a photoelectrode comprising the photoactive product disclosed herein. With respect to the photoelectrode, there is provided: the photoelectrode further comprises a conductive substrate. In other aspects, wherein the conductive substrate has at least one layer comprising the photoactive product, wherein the at least one layer is optionally, at least one film. In other aspects, wherein the conductive substrate comprises metal, glass, polymer or a combination thereof. In other aspects, wherein the conductive substrate comprises non-conductive glass or polymer and a conductive material, wherein the conductive material is selected from indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof and the polymer is selected from polyethylene terephthalate (PET), polyethylene naphthalate (PEN), polyimide (PI), or a combination thereof. In other aspects, wherein the conductive substrate comprises PET and ITO.

In another aspect, there is provided a method for making the photoelectrode disclosed herein, the method comprising depositing the at least one layer on the conductive substrate. With respect to the method, there is provided: in other aspects, wherein a solution comprising the photoactive product is deposited on the conductive substrate forming a single layer or multi-layer. In other aspects, wherein the depositing comprises dip coating, spray coating, drop casting, such as layer by layer drop casting, spin coating, electrophoretic deposition, vapor deposition, sputtering deposition, coating or chemical vapor deposition (CVD), aerosol deposition (AD) method, or a combination thereof. In other aspects, wherein the conductive substrate is activated, such as via oxidation, prior to deposition of the at least one layer.

In another aspect, there is provided a photoelectrode made by the method disclosed herein.

In another aspect, there is provided a device comprising the photoactive product disclosed herein. In another aspect, there is provided a device comprising the photoelectrode disclosed herein. In other aspects, wherein the device is a biosensor.

In another aspect, there is provided a biosensor for detecting at least one analyte comprising the photoelectrode disclosed herein, wherein the photoactive product further comprises the biomolecule(s) or synthetic analog(s). With respect to the biosensor, there is provided: in other aspects, wherein the biomolecule(s) or synthetic analog(s) thereof are selected from oligonucleotide(s), oligopeptide(s), antibodie(s), aptamer(s), DNAzyme(s), molecular imprinted polymer(s), oligosaccharide(s), or a combination thereof. In other aspects, wherein the biomolecule(s) comprise oligonucleotide(s). In other aspects, wherein binding of the at least one analyte results in a change in signal, such as a change in photoelectrochemical current, potential, and/or impedance. In other aspects, wherein the analyte is a biologically-relevant target. In other aspects, wherein the biologically-relevant target is a nucleic acid.

In another aspect, there is provided a method for detecting at least one analyte in a sample, comprising: a) exposing the biosensor to a sample suspected of comprising the at least one analyte under conditions for binding the analyte to the biomolecules, and b) producing a change in signal. With respect to the method, there is provided: in other aspects, wherein the exposing comprises contacting the biosensor with the sample. In other aspects, wherein the change in signal comprises a change in photoelectrochemical current, potential, and/or impedance. In other aspects, wherein the change in signal is measured. In other aspects, wherein the analyte is a biologically-relevant target. In other aspects, wherein the biologically-relevant target is a nucleic acid.

In another aspect, there is provided a photoelectrode comprising: a) a catechol-containing molecule, b) an amine-containing polymer, and c) a plurality of photoactive nanoparticles or microparticles wherein a) to c) are combined in solution phase and deposited as a film on a conductive substrate surface. With respect to the photoelectrode, there is provided: in another aspect, wherein the catechol-containing molecule comprises 3,4-dihydroxybenzaldehyde, 3,4-dihydroxyphenylalanine, 3,4-dihydroxybenzoic acid, 3,4-dihydroxyphenylacetic acid, 3,4-dihydroxyhydrocinnamic acid, 4,5-dihydroxy-1,3-benzenedisulfonic acid, caffeic acid, gallic acid or dopamine. In other aspects, wherein the catechol-containing molecule comprises 3,4-dihydroxybenzaldehyde. In other aspects, wherein the amine-containing polymer comprises chitosan. In other aspects, wherein the nanoparticles or microparticles comprise a material selected from the group consisting of metal, metal oxides, semiconductor material, carbon-based material, conducting polymer, photoactive polymer, plasmonic materials, and dye or combinations thereof. In other aspects, wherein the nanoparticles or microparticles comprise a material selected from the group consisting of titanium dioxide, zinc oxide, iron oxide, cadmium sulfide or cadmium telluride. In other aspects, wherein the nanoparticles or microparticles comprise titanium dioxide. In other aspects, wherein the conductive substrate comprises a metal, highly doped semiconductor or conductive polymer. In other aspects, wherein the conductive substrate comprises indium tin oxide.

In another aspect, there is provided a biosensor for detecting an analyte comprising: a) the photoelectrode as disclosed herein, further comprising b) a plurality of biomolecules or synthetic analogs thereof functionalized onto the film. In other aspects, wherein the biomolecules or synthetic analogue thereof comprise oligonucleotides, oligopeptides, antibodies, aptamers, DNAzymes or oligosaccharides. With respect to the biosensor, there is provided: in another aspect, wherein the biomolecules comprise oligonucleotides. In other aspects, wherein binding of the analyte results in a change of photoelectrochemical current.

In another aspect, there is provided a method for fabricating a photoelectrode comprising: a) activating a conductive substrate by oxidation of a surface layer, b) combining a catechol-containing molecule, an amine-containing polymer, and a plurality of photoactive nanoparticles or microparticles in a liquid phase mixture, and c) depositing the liquid phase mixture onto the conductive substrate. With respect to the method, there is provided: in another aspect, wherein depositing the liquid phase mixture onto the conductive substrate comprises single layer or multi-layer dip coating, drop casting spin coating or electrophoretic deposition. In other aspects, wherein depositing the liquid phase mixture onto the conductive substrate comprises layer-by-layer drop casting.

In another aspect, there is provided a method for fabricating a biosensor for detecting an analyte comprising: a) fabricating the photoelectrode as disclosed herein, and b) further functionalizing with a plurality of biomolecules or synthetic analogues thereof. In another aspect, there is provided a method of detecting one or more analytes in a sample, comprising: a) contacting a sample suspected of comprising the analyte with the biosensor as disclosed herein under conditions for binding the analyte to the biomolecules, and b) measuring the change in photoelectrochemical current. With respect to the methods, there is provided: in another aspect, wherein the analyte is a biologically-relevant target. In other aspects, wherein the biologically-relevant target is a nucleic acid.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

Certain embodiments of the application will now be described with reference to the drawings in which:

FIG. 1 shows chemical characterization of P25-$TiO_2$ modified with different ligands in exemplary embodiments of the application: (a) chemical structures of (i) catecholic bonding of 3,4-dihydroxybenzaldehyde (DHB) to P25-$TiO_2$, (ii) bonding between chitosan (CHIT) and P25-$TiO_2$ and (iii) catecholic bonding between DHB-CHIT and P25-$TiO_2$; (b) FTIR spectra of as-received (i) DHB and (ii) CHIT powders and FTIR spectra of P25-$TiO_2$ modified with (iii) CHIT, (iv) DHB and (v) DHB-CHIT.

FIG. 2 shows Raman spectroscopy of (i) unmodified P25-$TiO_2$, (ii) DHB-modified P25-$TiO_2$, (iii) CHIT-modified P25-$TiO_2$, and (iv) DHB-CHIT-modified P25-$TiO_2$ in exemplary embodiments of the application.

FIG. 3 shows structural, optical, and photoelectrochemical characterization of films created from unmodified and functionalized P25-$TiO_2$ nanoparticles in exemplary embodiments of the application: (a) schematics of (i) unmodified P25-$TiO_2$, (ii) DHB-modified P25-$TiO_2$, (iii) CHIT-modified P25-$TiO_2$, and (iv) DHB-CHIT-modified P25-$TiO_2$; (b) exemplary scanning electron micrographs of films created from P25-$TiO_2$ nanoparticles (i)-(iv); (c) UV/Visible absorbance of films created from P25-$TiO_2$ nanoparticles (i)-(iv); (d) incident photon-to-electron conversion efficiency (IPCE) of films created from P25-$TiO_2$ nanoparticles (i)-(iv) (the inset in (d) demonstrates the mechanism of photoelectrochemical oxidation of ascorbic acid (AA) using P25-$TiO_2$).

FIG. 4 shows bandgap measurements of modified $TiO_2$ nanoparticles in exemplary embodiments of the application: diffuse reflectance spectroscopy was performed on photoelectrodes with different surface functionalization; bandgap of 3.04 eV was obtained for all four materials by extrapolating the linear portion of the obtained curves to determine the x-intercept.

FIG. 5 shows enhancement of the base photocurrent of the P25-$TiO_2$ electrodes in exemplary embodiments of the application: (a) PEC current density measurements for P25-$TiO_2$ with different surface functionalization and their respective current response (left) and as summarized in bar plots (right)—the inset demonstrates the spectrum of the optical excitation source ("D" denotes DHB, and "C" denotes CHIT); (b) PEC current density measurements with increasing P25-$TiO_2$ concentration in a P25-$TiO_2$-DHB-CHIT film (left) and as summarized as bar plots (right)—1-6× concentration refers to 33.3, 66.6, 99.9, 133.2, 166.5, and 199.8 g $L^{-1}$, respectively; error bars represent one standard deviation.

FIG. 6 shows photoelectrochemical DNA detection using $TiO_2$-DHB-CHIT electrodes in exemplary embodiments of the application: (a) exemplary scanning electron micrograph of $TiO_2$-DHB-CHIT electrodes; (b) schematic demonstration of the bio-functionalization of electrodes with probe DNA, hybridization with complementary target DNA, and photoelectrochemical detection using AA as the reporter; (c) photocurrent density of bare, probe-modified, and probe modified electrode hybridized with complementary DNA target (+target); (d) the percentage current decrease measured between probe modified electrodes incubated with matched (complementary) and mismatched target DNA; error bars represent one standard deviation.

DETAILED DESCRIPTION

I. Definitions

Figure 1:
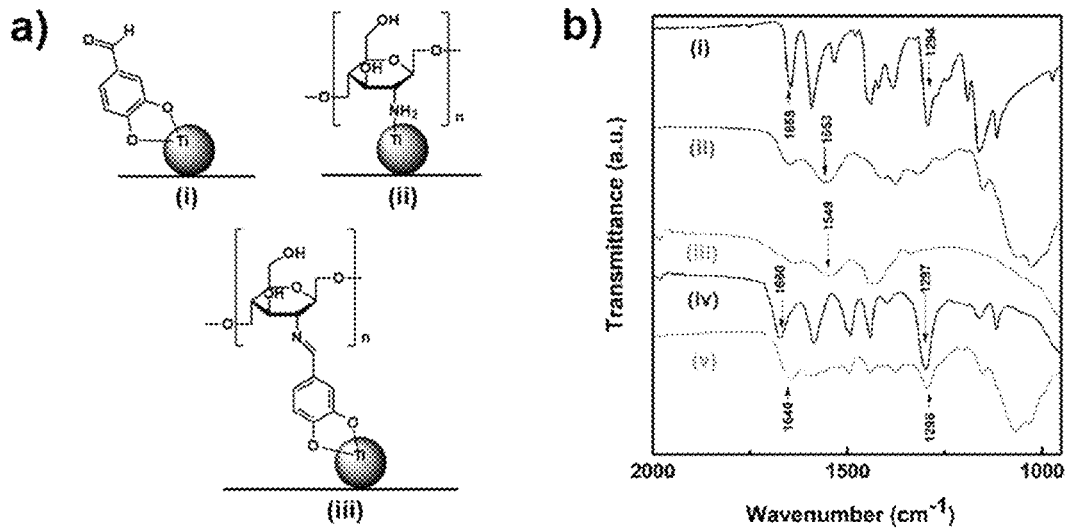

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is chemically different from the other components or first component. A "third" component is different from the other, first, and second components, and further enumerated or "additional" components are similarly different.

The abbreviation, "e.g." is derived from the Latin exempli gratia and is used herein to indicate a non-limiting example. Thus, the abbreviation "e.g." is synonymous with the term "for example." The word "or" is intended to include "and" unless the context clearly indicates otherwise.

The term "and/or" as used herein means that the listed items are present, or used, individually or in combination. In effect, this term means that "at least one of" or "one or more" of the listed items is used or present.

It will be understood that any component defined herein as being included may be explicitly excluded from the claimed invention by way of proviso or negative limitation.

In addition, all ranges given herein include the end of the ranges and also any intermediate range points, whether explicitly stated or not.

The term "target", "analyte" or "target analyte" as used herein refers to any agent, including, but not limited to nucleic acids, small inorganic and organic molecules, metal ions, biomolecules, toxins, biopolymers (such as carbohydrates, lipids, peptides, proteins), cells, tissues and microorganisms (including bacteria and viruses), for which one would like to sense or detect. In an embodiment the analyte is either isolated from a natural source or is synthetic. The analyte may be a single compound or a class of compounds, such as a class of compounds that share structural or functional features. The term analyte also includes combinations (e.g. mixtures) of compounds or agents such as, but not limited to, combinatorial libraries and samples from an organism or a natural environment.

The term "nucleic acid" as used herein may refer to a polynucleotide, such as deoxyribonucleic acid (DNA), ribonucleic acid (RNA), modified nucleotides and/or nucleotide derivatives, and may be either double stranded (ds) or single stranded (ss). In some embodiments, modified nucleotides may contain one or more modified bases (e.g. tritiated bases and unusual bases such as inosine), modified backbones (e.g. peptide nucleic acid, PNA) and/or other chemically, enzymatically, or metabolically modified forms.

The term "antibody" as used herein may refer to a glycoprotein, or antigen-binding fragments thereof, that has specific binding affinity for an antigen as the target analyte. Antibodies may be monoclonal and/or polyclonal antibodies.

The term "aptamer" as used herein may refer to a short, chemically synthesized nucleic acid molecule or oligonucleotide sequence which can be generated by in vitro selection to fold into specific three-dimensional (3D) structures that bind to a specific analyte with dissociation constants, for example, in the pico- to nano-molar range. Aptamers may be single-stranded DNA, and may include RNA, modified nucleotides and/or nucleotide derivatives. Aptamers may also be naturally occurring RNA aptamers termed "riboswitches".

The term "DNAzyme" as used herein may refer to a nucleic acid molecule or oligonucleotide sequence that can catalyze or initiate a reaction upon recognizing and binding to an analyte. For example, a DNAzyme may be "RNA-cleaving" and catalyzes the cleavage of a particular substrate, for example a nucleic acid sequence comprising one or more ribonucleotides, at a defined cleavage site. DNAzymes may be single-stranded DNA, and may include RNA, modified nucleotides and/or nucleotide derivatives.

The term "polymer" as used herein refers to a molecule comprising a plurality of repeat units or monomers. A polymer can comprise one or more distinct repeat units. For example, a "copolymer" refers to a polymer having two or more distinct repeat units. Repeat units can be arranged in a variety of manners. For example, a homopolymer refers to a polymer with one type of repeat unit where the repeat units are adjacently connected. In another example, a plurality of different repeat units can be assembled as a copolymer. If A represents one repeat unit and B represents another repeat unit, copolymers can be represented as blocks of joined units (e.g., A-A-A-A-A-A . . . B-B-B-B-B-B . . . ) or interstitially spaced units (e.g., A-B-A-B-A-B . . . or A-A-B-A-A-B-A-A-B . . . ), or randomly arranged units. These representations can be made with 3 or more types of repeat units as well. In general, polymers (e.g., homopolymers or copolymers) include macromolecules in a broad range of configurations (e.g., cross-linked, linear, and/or branched).

The term "photocatalyst" as used herein refers to a substance that drives a light-catalyzed reaction.

The term "photoelectrode" as used herein can be a semiconducting material having a photoactive product such as a photocatalyst. A photoelectrode may be a layer such as a transparent electrode layer disposed on the light incident side or on the viewing (observation) side. A photoelectrode can include a conductive substrate having a photoactive product (e.g. semiconductor coating). The substrate may include glass, polymer, metal or a combination thereof. The polymer may include polyethylene terephthalate (PET), polyethylene naphthalate (PEN) or polyimide (PI). If the substrate of the conductive substrate is made of non-conductive glass or polymers, a conductive material is provided such as, for example, indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof.

II. Products and Methods

In PEC, it is desirable to achieve a higher incident photon-to-electron conversion efficiency (IPCE) to enhance the electrochemical reaction rate and the resultant photoelectrochemical current. To have higher IPCE, photoactive materials/products, typically, have higher photon absorption and lower carrier recombination rates. In certain embodiments, photoactive materials/products may be embedded in a three dimensional and porous architecture with a high internal surface area that is capable of interacting effectively with an electrolyte, enable efficient charge transport, and offer low losses due to carrier recombination.

$TiO_2$ nanoparticles are commonly used in PEC and, in particular, $P25-TiO_2$ nanoparticles, combining anatase (>70%) and rutile structures, have been regarded as the benchmark $TiO_2$ nanoparticles for PEC due to their enhanced photoactivity. This has been attributed to increased carrier lifetime enabled by charge transfer from the rutile to the anatase phase, improved crystallinity, increased defect density, and larger crystal sizes. In spite of such benefits, $P25-TiO_2$ in its pristine form has a wide bandgap (3.0-3.2 eV), which limits its absorption to the UV range. To increase the number of absorbed photons and further increase the lifetime of photogenerated carriers, the electronic structure of this material has been altered by doping with impurities, disorder engineering with the use of core-shell nanoparticles, and surface modification with, for example, quantum dots and plasmonic metal nanoparticles. To use such electronically-optimized materials in photoelectrochemical devices, it was embedded in photoactive frameworks that have effective charge transfer properties and are reasonably stable under electrochemical cycling in liquids. Consequently, additional steps such as sintering, addition of binders, mechanical compression, deposition of amorphous $TiO_2$ binder layers using post deposition sol-gel and chemical vapour deposition, and irradiation with microwave have been employed to incorporate $TiO_2$ nanoparticles into photoactive electrodes. These additional steps can result in the loss of porosity in the three-dimensional network of particles and add to the overall cost, complexity, and thermal budget of the process.

In view of the above, improved photoactive products are needed for PEC.

In an embodiment, a photoactive product comprises a catechol-containing compound, an amine-containing polymer, and photoactive material. In embodiments, the photoactive product may be a Schiff base (i.e. imine product), an amide, and/or a sulfonamide. In a typical embodiment, the photoactive product is the Schiff base. In another embodiment, the catechol-containing compound may be coupled (e.g. form a covalent bond) with the amine-containing polymer to form a first product and the first product may be a Schiff base (i.e. imine product), an amide, and/or a sulfonamide. The photoactive material can be functionalized with the first product/modified by the first product. With respect to functionalization/modification, it is understood to include, for example, coupling of the catechol portion of the catechol-containing compound (e.g. forming ligands) with the photoactive material.

The catechol-containing compound, the amine-containing polymer, and the photoactive material are present in the photoactive product in any suitable amount and may depend on the desired use. In typical embodiments, the catechol-containing compound and the amine-containing polymer are in a mole ratio of from about 1:1 to 5:1, from about 1:1 to 4:1, from about 1.5:1 to 4:1, from about 2:1 to 5:1, from about 2:1 to 4:1, from about 2:1 to 3:1, or from about 2:1.

The photoactive product can further comprise biomolecule(s) or synthetic analog(s). In embodiments, the biomolecule(s) or synthetic analog(s) thereof are selected from oligonucleotide(s), oligopeptide(s), antibodie(s), aptamer(s), DNAzyme(s), molecular imprinted polymer(s), oligosaccharide(s), or a combination thereof. In another embodiment, the biomolecule(s) comprise oligonucleotide(s). For example, the catechol-containing compound may be coupled (e.g. form a covalent bond) with the biomolecule(s) or synthetic analog(s) to form a second product and, like the first product, the second product may be a Schiff base (i.e. imine product), an amide, and/or a sulfonamide. The photoactive material can be functionalized with the first product/modified by the first product, as well as the photoactive material can be functionalized with the second product/modified by the second product. With respect to functionalization/modification, it is understood to include, for example, coupling of the catechol portion of the catechol-containing compound (e.g. forming ligands) with the photoactive material.

The catechol-containing compound, the amine-containing polymer, the biomolecule(s) or synthetic analog(s) thereof and the photoactive material are present in the photoactive product in any suitable amount and may depend on the desired use. In typical embodiments, the catechol-containing compound, the amine-containing polymer, and the biomolecule(s) or synthetic analog(s) thereof are in a mole ratio of from about 1:1:1 to 5:1:1, from about 2:1:1 to 5:1:1, from about 3:1:1 to 4:1:1, or from about 3:1:1.

The photoactive product may be made by a method comprising: combining a catechol-containing compound, an amine-containing polymer and photoactive material. In an embodiment, a method comprises: i) combining a catechol-containing compound and an amine-containing polymer to form a first product; and ii) combining the first product with the photoactive material to form the photoactive product. The first product may be a Schiff base (i.e. imine product), an amide, and/or a sulfonamide. For example, the first product may form a first Schiff base (i.e. imine product) and the hydroxyl groups of the catechol portion of the catechol-containing compound form ligands with the photoactive material. The photoactive material can be functionalized with the first product/modified by the first product. With respect to functionalization/modification, it is understood to include, for example, coupling of the catechol portion of the catechol-containing compound (e.g. forming ligands) with the photoactive material. In other embodiments, the method is a single-pot synthesis. The method can also include a solution of the catechol-containing compound, the amine-containing polymer and the photoactive material. The solvent can be any suitable solvent such that, for example, the catechol-containing compound and the amine-containing polymer can react with one another. Solvents include, for example, aqueous solvents or alcohols, such as aqueous acidic solvents.

The catechol-containing compound, the amine-containing polymer, and the photoactive material are present in the photoactive product in any suitable amount and may depend on the desired use. In typical embodiments, the catechol-containing compound and the amine-containing polymer are in a mole ratio of from about 1:1 to 5:1, from about 1:1 to 4:1, from about 1.5:1 to 4:1, from about 2:1 to 5:1, from about 2:1 to 4:1, from about 2:1 to 3:1, or from about 2:1.

In embodiments, the photoactive product may be made by a method comprising: combining a catechol-containing compound, an amine-containing polymer, the biomolecule(s) or synthetic analog(s), and photoactive material. In an embodiment, a method comprises: i) combining the catechol-containing compound, the amine-containing polymer, and the biomolecule(s) or synthetic analog(s) to form a first product and a second product, wherein the first product comprises the catechol-containing compound and the amine-containing polymer and the second product comprises the catechol-containing compound and the biomolecule(s) or synthetic analog(s); and ii) combining the first product and the second product with the photoactive material to form the photoactive product. In embodiments, the biomolecule(s) or synthetic analog(s) thereof are selected from oligonucleotide(s), oligopeptide(s), antibodie(s), aptamer(s), DNAzyme(s), molecular imprinted polymer(s), oligosaccharide(s), or a combination thereof. In another embodiment, the biomolecule(s) comprise oligonucleotide(s). For example, the catechol-containing compound may be coupled (e.g. form a covalent bond) with the biomolecule(s) or synthetic analog(s) to form a second product and, like the first product, the second product may be a Schiff base (i.e. imine product), an amide, and/or a sulfonamide. The photoactive material can be functionalized with the first product/modified by the first product, as well as the photoactive material can be functionalized with the second product/modified by the second product. With respect to functionalization/modification, it is understood to include, for example, coupling of the catechol portion of the catechol-containing compound (e.g. forming ligands) with the photoactive material.

The catechol-containing compound, the amine-containing polymer, the biomolecule(s) or synthetic analog(s) thereof and the photoactive material are present in the photoactive product in any suitable amount and may depend on the desired use. In typical embodiments, the catechol-containing compound, the amine-containing polymer, and the biomolecule(s) or synthetic analog(s) thereof are in a mole ratio of from about 1:1:1 to 5:1:1, from about 2:1:1 to 5:1:1, from about 3:1:1 to 4:1:1, or from about 3:1:1.

The catechol-containing compound (i.e. catechol-containing molecule) may be any suitable catechol-containing compound that has a functional group that can react with the amine group of the amine-containing polymer such that the catechol-containing compound is coupled (e.g. forms a covalent bond) with the amine-containing polymer. For example, the catechol-containing compound is coupled (e.g. forms a covalent bond) with the amine-containing polymer to form a Schiff base (i.e. imine product), an amide, and/or a sulfonamide. These reactions can occur via 1-Ethyl-3-(3-dimethylaminopropyl)carbodiimide/N-hydroxysuccinimide (EDC/NHS) reactions. The functional group of the catechol-containing compound can be any functional group that reacts with amines. For example, the functional groups can be carbonyl groups (e.g. aldehydes, ketones, esters, carboxylic acids, or amides), sulfonyl groups (e.g. sulfonic acids), amines, alkenes, alkynes, and the like. The catechol-containing compound may comprise, for example, 3,4-dihydroxybenzaldehyde (DHB), 3,4-dihydroxyphenylalanine (DOPA), 3,4-dihydroxybenzoic acid (DHBA), 3,4-dihydroxyphenylacetic acid (DHPAA), 3,4-dihydroxyhydrocinnamic acid (DHHCA), 4,5-dihydroxy-1,3-benzenedisulfonic acid (DHBSA), caffeic acid (CA), gallic acid (GA), dopamine (DA), 2,3,4-trihydroxybenzaldehyde (THB), 2,3,4-trihydroxybenzoic acid (THBA), and combinations thereof.

The amine-containing polymer may include any homopolymer or copolymer that has at least a portion of its repeat units containing an amine (e.g. secondary or primary amine). The amine-containing polymer can contain repeat units with primary amines due to the reactivity of the primary amine. The amine-containing polymer can include at least one segment of amino sugars, lysine, aromatic amine, vinyl amine, and allyl amine. In a particular embodiment, the amine-containing polymer includes one or more segments of any one of amino sugars, lysine, and branched polyethyleneimine. Any of the specific types of amine-containing polymers can be used in any mixture type (e.g. chitosan or polyalkyleneimines or a combination of the two). For instance, in describing the average molecular weight of an amine-containing polymer, it is understood that such average molecular weights can be applied to any described polymer (e.g., homopolymers or copolymers of any particular type of polymer such as branched polyethyleneimine or polyvinylamine). Amine-containing polymers can be naturally occurring macromolecules with amine groups such as chitosan. Also, various types of synthetic polymers bearing amine groups such as polyalkyleneimines, polyvinylamine, polyallylamine, and polydiallylamine can be utilized. Copolymers comprising any combination of amine-containing homopolymer units can also be used. Though the average molecular weight of an amine-containing polymer is not necessarily limited, in some embodiments the average molecular weight of the amine-containing polymer can range from about 1 kDa to about 1000 kDa; or from about 10 kDa to about 500 kDa. In typical embodiments, the amine-containing polymer comprises chitosan.

The photoactive material may include photoactive particles (e.g. nanoparticles and/or microparticles), nanomaterials (e.g. nanowires, nanorods, nanostars, and the like), or a combination thereof. In specific embodiments, the photoactive material comprise, for example, conductor and/or semiconductor materials such as, for example, metal(s), metal oxide(s), semiconductor material(s), carbon-based material(s), conductive polymer(s), photoactive polymer(s), plasmonic material(s), dye(s), or combinations thereof.

Suitable transition metals that can serve as photoactive material include, but are not limited to, chromium, iron, nickel, manganese, copper, tungsten, cobalt, molybdenum, ruthenium, vanadium, zinc, silver, platinum, titanium and mixtures thereof.

Examples of semiconductor materials include inorganic semiconductor materials made of known inorganic substances such as known inorganic oxide semiconductor particles used in a photoelectrode of a dye-sensitized solar cell. More specific examples include titanium dioxide (titania), tin oxide, zinc oxide, niobium oxide, etc. In certain embodiments, the semiconductor particles includes titanium dioxide zinc oxide, zirconium dioxide, or a combination thereof. With respect to the titanium oxide, the crystal structure thereof may be any of anatase, rutile and brookite. With respect to the semiconductor particles, a single type thereof may be used independently or two or more types thereof may be used in combination. Other examples of semiconductors include an oxide of a metal element such as Cd, Zn, In, Pb, Mo, W, Sb, Bi, Cu, Hg, Ti, Ag, Mn, Fe, V, Sn, Zr, Sr, Ga, Si or Cr, a perovskite such as $SrTiO_3$ or $CaTiO_3$, a sulfide such as CdS, ZnS, $In_2S_3$, PbS, $Mo_2S$, $WS_2$, $Sb_2S_3$, $Bi_2S_3$, $ZnCdS_2$ or $Cu_2S$, or a metal chalcogenide such as CdSe, $In_2Se_3$, $WSe_2$, HgS, PbSe or CdTe, and it may also be GaAs, Si, Se, $Cd_2P_3$, $Zn_2P_3$, InP, AgBr, $PbI_2$, $HgI_2$ or $BiI_3$. Among others, CdS, ZnS, $In_2S_3$, PbS, $Mo_2S$, $WS_2$, $Sb_2S_3$, $Bi_2S_3$, $ZnCdS_2$, $Cu_2S$, InP, $Cu_2O$, CuO and CdSe, which are are capable of absorbing light whose wavelength is about 350 nm to about 1300 nm. Moreover, it may also be a complex including at least one or more semiconductors including, for example, $CdS/TiO_2$, CdS/AgI, $Ag_2S$/AgI, CdS/ZnO, CdS/HgS, CdS/PbS, ZnO/ZnS, ZnO/ZnSe, CdS/HgS, $CdS_x/CdSe_{1-x}$, $CdS_x/Te_{1-x}$, $CdSex/Te_{1-x}$, ZnS/CdSe, ZnSe/CdSe, CdS/ZnS, $TiO_2/Cd_3P_2$, $CdS/CdSeCd_yZn_{1-y}S$ or CdS/HgS/CdS. Moreover, it may also be an organic semiconductor such as, for example, polyphenylenevinylene, polythiophene, polyacetylene, tetracene, pentacene or phthalocyanine.

The size (average particle diameter) of the photoactive particles is any suitable size, and, in certain embodiments, is in the range of about 10 nm to about 100 μm for forming a porous film constituting a photoelectrode. The photoactive particles may include large diameter and small diameter particles. With respect to the large diameter particles, typically, the large diameter particles are not aggregates of smaller particles. The large diameter particles may be in the range of about 50 nm to 3 μm. The average particle diameter of the large diameter particles may be 100 nm to 2 μm, or 150 nm to 1.5 μm. The particle size will vary depending on the desired use.

The photoactive product can be used in a wide variety of photoelectrochemical devices. In certain embodiments, the photoactive product is a photocatalyst. Since the photoactive product may undergo an efficient oxidation-reduction reaction when exposed to light, it can be used as a photocatalyst, photoelectrode or the like. More specifically, the photoactive product can be used in any suitable photoelectrochemical applications including, for example, biosensors, solar cells (such as dye-sensitized solar cells), photoelectrochemical hydrogen production systems and the like.

In embodiments, the photoactive product has an enhancement in IPCE of at least about 50%, at least about 60%, at least about 70%, at least about 80%, or at least about 90% compared to unmodified photoactive material. In embodiments, the enhancement is measured at about 395 nm.

With respect to a photoelectrode, the photoelectrode comprises the photoactive product disclosed herein and the product itself may be made in accordance with the method disclosed herein. In certain embodiments, the photoelectrode comprises a photoactive product, wherein the photoactive product comprises a catechol-containing compound, an amine-containing polymer, and photoactive material. As described above with respect to the embodiments of the photoactive product, the catechol-containing compound is coupled (e.g. forms a covalent bond) with the amine-containing polymer, to form, for example, a Schiff base (i.e. imine product), an amide, and/or a sulfonamide. The photoactive material is functionalized with or modified by the first product. The catechol portion of the catechol-containing compound can be coupled to the photoactive material. The catechol-containing compound, the amine-containing polymer, and the photoactive material may be selected from any of the embodiments disclosed above.

As described above, the photoactive product can further comprise biomolecule(s) or synthetic analog(s). In embodiments, the biomolecule(s) or synthetic analog(s) thereof are selected from oligonucleotide(s), oligopeptide(s), antibodie(s), aptamer(s), DNAzyme(s), molecular imprinted polymer(s), oligosaccharide(s), or a combination thereof. In another embodiment, the biomolecule(s) comprise oligonucleotide(s). For example, the catechol-containing compound may be coupled (e.g. form a covalent bond) with the biomolecule(s) or synthetic analog(s) to form a second product and, like the first product, the second product may be a Schiff base (i.e. imine product), an amide, and/or a sulfonamide. The photoactive material can be functionalized with the first product/modified by the first product, as well as the photoactive material can be functionalized with the second product/modified by the second product. With respect to functionalization/modification, it is understood to include, for example, coupling of the catechol portion of the catechol-containing compound (e.g. forming ligands) with the photoactive material. The catechol-containing compound, the amine-containing polymer, the biomolecule(s) or synthetic analog(s) thereof and the photoactive material are present in the photoactive product in any suitable amount and may depend on the desired use. In typical embodiments, the catechol-containing compound, the amine-containing polymer, and the biomolecule(s) or synthetic analog(s) thereof are in a mole ratio of from about 1:1:1 to 5:1:1, from about 2:1:1 to 5:1:1, from about 3:1:1 to 4:1:1, or from about 3:1:1.

In embodiments, the photoelectrode has an enhancement in IPCE of at least about 50%, at least about 60%, at least about 70%, at least about 80%, or at least about 90% compared to unmodified photoactive material. In embodiments, the enhancement is measured at about 395 nm.

In another embodiment, the photoelectrode comprises the photoactive product disclosed herein and a conductive substrate. The photoactive product may be a layer or film deposited on the conductive substrate. A method for making a photoelectrode comprises depositing the photoactive product disclosed herein on the conductive layer. In some embodiments, a solution comprising the photoactive product is deposited onto the conductive substrate forming a single layer or multi-layer dip coating. The single layer or multi-layer may, for example, be formed by a single layer or multi-layer dip coating, spray coating, drop casting (e.g. layer by layer drop casting), spin coating or electrophoretic deposition. In other embodiments, the single layer or multi-layer may, for example, be formed by spraying the photoactive product on a substrate to form a photoactive product layer (e.g. film) thereon. Various methods of deposition of the layer(s) include, for example, vapor deposition, sputtering deposition, coating or chemical vapor deposition (CVD). Another method includes an aerosol deposition method (AD method) in which an aerosol obtained by mixing a carrier gas with the photoactive product is sprayed onto a substrate, an electrostatic particle coating method in which the photoactive product are accelerated by electrostatic attraction, and a cold spray method. The AD method (WO2012/161161) enables easy formation of a porous layer (e.g. film) suitable for a photoelectrode. In a certain embodiment, a method for fabricating a photoelectrode comprises activating a conductive substrate by oxidation of a surface layer, combining a catechol-containing compound, an amine-containing polymer, and a plurality of photoactive nanoparticles or microparticles in a liquid phase mixture, and depositing the liquid phase mixture onto the conductive substrate.

In embodiments, one-pot fabrication of photoelectrodes using a solution-based process can provides translation from bench-scale to an industrial scale. As such, the unique and facile route developed here for enhancing the performance of photoelectrodes (e.g. $TiO_2$-based photoelectrodes can provide improved efficiency in other PEC technologies developed for energy conversion and environmental cleaning.

In embodiments, and as outlined under the definitions, the conductive substrate may include glass, polymer, metal or a combination thereof. The polymer may include polyethylene terephthalate (PET), polyethylene naphthalate (PEN) or polyimide (PI). If the substrate of the conductive substrate is made of non-conductive glass or polymers, a conductive material may be provided such as, for example, indium tin oxide (ITO), fluorine-doped tin oxide (FfO), antimony-doped tin oxide (ATO), aluminum-doped zinc oxide (AZO), gallium-doped zinc oxide (GZO), indium-doped zinc oxide (IZO) or a combination thereof. The conductive substrate may comprise a metal, doped semiconductor or conductive polymer. In some embodiments, the conductive substrate comprises ITO. In other embodiments, the conductive substrate comprises PET/ITO.

In specific embodiments, the photoelectrodes disclosed herein can provide increased light absorption and charge separation, binding sites for attaching biorecognition probes, and built-in film-forming properties for creating well-adhered and uniform photoactive frameworks on the collector electrodes. In an embodiment, the photoelectrode is modified with hybrid organic/inorganic materials, such as $TiO_2$-DHB-CHIT.

In embodiments, the photoelectrodes are stable and can have higher incident photon-to-electron conversion efficiency (IPCE) for use in photoelectrochemical devices, such as biosensors. In certain embodiments, unmodified P25-$TiO_2$, P25-$TiO_2$ nanoparticles functionalized with CHIT, P25-$TiO_2$ nanoparticles functionalized with DHB, and P25-$TiO_2$ nanoparticles functionalized with DHB-CHIT were evaluated with Fourier Transform Infrared Spectroscopy (FTIR), and their structural and functional characteristics were compared using scanning electron microscopy (SEM), IPCE and photo-current measurements.

In embodiments, the photoactive material functionalized with the catechol-containing compound and the amine-containing polymer (e.g. Schiff base) can have demonstrated increased photonic absorption over the UV and visible wavelengths and significantly enhanced IPCE and the resultant photoelectrochemical current by a factor of about 10, about 9, about 8, about 7, about 6, about 5, about 4, about 3, or about 2. In embodiments, layers (e.g. films) that included both the catechol and chitosan elements demonstrated increased photonic absorption over the UV and visible wavelengths and significantly enhanced IPCE and the resultant photoelectrochemical current by a factor of about 10. In embodiments, the enhanced photoelectrochemical response was the result of the synergistic effect of the catechol-containing compound in modifying the electronic and optical properties of the photoactive material. For example, the enhanced photoelectrochemical response was the result of the synergistic effect of the catechol-containing compound in modifying the electronic and optical properties of P25-$TiO_2$ as indicated by UV and IPCE measurements and the amine-containing polymer for improving its film-forming properties as evidenced by SEM characterization. In addition to offering an order of magnitude enhancement in photocurrent, in embodiments, the photoelectrodes disclosed herein can enable integration with biorecognition elements, such as DNA. Amine-terminated DNA may be conjugated within the photoactive framework through coupling (e.g. Schiff-based) reactions with the catechol-containing compound (e.g. DHB). Such biofunctionalized photoactive electrode embodiments disclosed herein offered the signal-to-noise-ratio and stability for performing biosensing experiments and were able to distinguish between complementary and non-complementary DNA sequences (e.g. at a concentration of 0.5 µM). In embodiments, integrating P25-$TiO_2$ nanoparticles in a catecholic polymeric framework provides for the introduction of photoactive materials onto collector electrodes for photoelectrochemical biosensing.

In specific embodiments, an effective conjugation strategy for integrating photoactive material (e.g. $TiO_2$ nanoparticles) into photoelectrodes, using two components that work synergistically to increase the photoelectrochemical current of the transducers. A catechol-containing compound, such as DHB, can be used for improving the dispersion of photoactive material (e.g. $TiO_2$ nanoparticles), wet-state adhesion and enhancing the electronic and optical properties of photoactive material (e.g. $TiO_2$ nanoparticles) for signal generation, while an amine-containing polymer (e.g. amine-containing polysaccharide, such as CHIT) can be used to boost the electrochemical behaviour of photoactive material (e.g. $TiO_2$ nanoparticles) and enhance the film-forming properties of the catechol-conjugated photoactive material (e.g. $TiO_2$ nanoparticles) to form uniform and stable films. Photoactive material (e.g. $TiO_2$ nanoparticles) can be dispersed into a catechol-containing compound—an amine-containing polymer (e.g. DHB-CHIT) utilizing a Schiff base reaction between DHB and CHIT and this hybrid organic/inorganic material can be applied to a conductive substrate using, for example, a one step drop casting method. Together, a catechol-containing compound—an amine-containing polymer (e.g. DHB-CHIT) can result in the formation of an extensive network of photoactive material (e.g. $TiO_2$ nanoparticles) within the catechol-containing compound—an amine-containing polymer (e.g. DHB-CHIT) matrix to create photoelectrodes with enhanced photocurrent generation that may be modified with biomolecules to create a photoelectrochemical biosensor. In an embodiment, the $TiO_2$-DHB-CHIT photoelectrodes modified with DNA probes can offer stability and signal magnitude to distinguish between complementary and non-complementary DNA sequences.

III. Devices

PEC devices can include a photo-electrochemical device, an optoelectronic device, an electrochemical battery, (for example a lithium ion battery), a double layer capacitor, a light emitting device, an electrochromic or photo-electrochromic device, an electrochemical sensor, a biosensor, an electrochemical display, an electrochemical capacitor, (for example a super capacitor), and a photoelectric conversion device (e.g. a dye-sensitized solar cell (DSCC) or photovoltaic cell). Any PEC device can utilize the photoactive product disclosed herein and, in particular, the photoelectrode disclosed herein comprising the photoactive product.

Development of biosensors (e.g. ultrasensitive biosensors) for monitoring biologically-relevant analytes can provide point-of-care diagnostics and health monitoring devices. Using PEC, by combining photonic excitation with electrochemical readout, may enhance the limit-of-detection of biosensors by increasing their sensitivity and reducing background currents generated in biological samples. Functionalization of photoelectrochemical transducers with biorecognition elements significantly reduces the baseline current and signal to background ratio of these devices. Additionally, stability of photoactive electrodes created using photoactive nanomaterial assemblies can be insufficient for withstanding the multiple washing and potential cycling steps that are involved in biosensing protocols.

In some embodiments, the photoelectrode further comprises a plurality of biomolecules or synthetic analogs thereof functionalized onto the film and is used as a biosensor for detecting an analyte. In some embodiments, binding of the analyte results in a change of photoelectrochemical current. In some embodiments, the biomolecules or synthetic analogue thereof comprise oligonucleotide(s), oligopeptide(s), antibodie(s), aptamer(s), DNAzyme(s), molecular imprinted polymer(s), oligosaccharide(s), or a combination thereof. In typical embodiments, the biomolecule(s) comprise oligonucleotide(s). In a specific embodiment, the $TiO_2$-DHB-CHIT photoelectrode may be further modified to integrate amine-terminated DNA capture probes within the hybrid organic/inorganic framework to create a photoelectrochemical DNA biosensor.

To create a PEC biosensor for detecting DNA hybridization, the biosensor may have surfaces that generate PEC currents and selectively capture DNA targets. In embodiments, to introduce DNA capture capability, the biosensor comprises a photoactive product, where the photoactive product comprises a catechol-containing compound, an amine-containing polymer, a biomolecule or synthetic analogue thereof, and photoactive material. In embodiments, the photoactive product may be a Schiff base (i.e. imine product), an amide, and/or a sulfonamide. In embodiments, the catechol-containing compound may be coupled (e.g. form a covalent bond) with the amine-containing polymer to form a first product and the catechol-containing compound may be coupled (e.g. form a covalent bond) with the biomolecule or synthetic analogue thereof to form a second product. At least a portion of the photoactive material is functionalized with the first product/modified by the first product and at least another portion of the photoactive material is functionalized with the second product/modified by the second product. Any suitable concentrations of the components may be used. In typical embodiments, the catechol-containing compound is in excess to the concentrations of the amine-containing polymer and the biomolecule or synthetic analogue thereof to increase the overall binding sites for the amine-containing polymer and the biomolecule or synthetic analogue thereof.

In some embodiments, the method further comprises functionalizing with a plurality of biomolecules or synthetic analogues thereof to fabricate a biosensor for detecting an analyte.

In another embodiment, a method of detecting one or more analytes in a sample comprises contacting a sample suspected of comprising the analyte with the biosensor provided herein under conditions for binding the analyte to the biomolecules, and measuring the change in photoelectrochemical current. In some embodiments, the analyte is a biologically-relevant target, such as a nucleic acid.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

The following non-limiting examples are illustrative of the present application:

Example 1. Materials and Methods

Chemicals: chitosan (CHIT), from shrimp shells (degree of deacetylation ≥75%), acetic acid, 3,4-dihydroxybenzaldehyde (DHB) and polyethylene terephthalate/indium tin oxide (PET/ITO) substrate were purchased from Sigma-Aldrich Canada. Aeroxide® P25-$TiO_2$ was obtained from Nippon Aerosil Co. Ltd.

$TiO_2$ Surface Modification: Four different aqueous P25-$TiO_2$ suspensions were prepared. One suspension contained bare P25-$TiO_2$ and the other three suspensions contained surface modified P25-$TiO_2$. CHIT, DHB and DHB-CHIT were used for surface modification and dispersion of P25-$TiO_2$. Aqueous CHIT solution was prepared by dissolving CHIT in deionized water using about 1% acetic acid. The final CHIT concentration was about 3 $gL^{-1}$. An aqueous solution of DHB was prepared by dissolving DHB in deionized water, with a final concentration of about 8 $gL^{-1}$. DHB-modified CHIT solution was obtained by modifying CHIT in the liquid phase. The mass ratio of DHB to CHIT added to the CHIT solution was about 2:1, and upon the addition of DHB solution to CHIT solution, the solution colour changed from clear to yellow. P25-$TiO_2$ was added to either a CHIT solution, DHB solution, or DHB-modified CHIT solution, to form suspensions containing surface modified P25-$TiO_2$.

Electrode Fabrication: All PET/ITO substrates with dimensions of about 1.0 cm×0.7 cm were masked using vinyl tape in order to preserve electrode contact area. Once masked, substrates were treated in oxygen plasma for about 1 minute. All films were fabricated by dropping about 10 microliters of solution onto exposed PET/ITO substrate surface. They were then air dried for about 30 minutes, washed in deionized water (DI) and air dried for a second time. This process was repeated for a total of 3 layers.

Material Characterization: The surface morphology of the fabricated substrates was analyzed using scanning electron microscopy (JEOL JSM-7000F) using conventional sample preparation procedures. A Bruker Vertex 70 spectrometer was used for Fourier Transform Infrared Spectroscopy (FTIR), and Flame-S-UV-VIS-ES assembly was used for ultraviolet-visible (UV-Vis) spectroscopy. Incident photon to current conversion efficiency (IPCE) measurements were obtained using a Zahner CIMPS-QE/IPCE3 Photo-Electrochemical Workstation in a three-electrode cell configuration with a solution containing about 0.1 M phosphate buffer saline (PBS) and about 0.1 M ascorbic acid (AA) as the supporting electrolyte and a tunable light source probing wavelengths from about 300-600 nm.

Photoelectrochemical Characterization: PEC measurements were carried out in a three-electrode cell setup with an ultraviolet flashlight to facilitate illumination of the photoelectrode surface. Platinum (Pt) wire was used as the counter electrode, silver/silver chloride (Ag/AgCl) as the reference electrode with the deposited films on PET/ITO substrates acting as the working electrode. A 0.1 M PBS solution with 0.1M ascorbic acid (AA) was used as the supporting electrolyte. Linear sweeps were measured by a CHI 660D electrochemical station, under UV illumination at every 20 s for a period of about 100 s. Photocurrents were reported as the difference in current with and without incident light on the face of the $TiO_2$ electrode.

DNA Hybridization Experiments: Electrodes were fabricated using a layer-by-layer drop casting method, followed by probe ssDNA (1 µM) deposition for about 3 h and incubation with non-complementary (about 0.5 µM) and complementary (about 0.5 µM) target DNA for about 60 mins. Electrodes were washed between each deposition step using DI water. Photoelectrochemical tests were run using a CHI 660D workstation and PBS:AA as the supporting electrolyte.

Example 2. Photoelectrode Characterization

In order to enhance the photocurrent of PEC sensors, bare P25-$TiO_2$ was modified with DHB, CHIT, and DHB-CHIT (FIG. 1). The catechol functional group of DHB can provide ultra-strong adhesion to inorganic particles and surfaces, and form a charge-transfer complex between the inorganic particles and the catechol-containing molecule. This modification can tune the electronic and optical properties of the material and imparts redox-activity [1, 2]. In addition to electronic and optical tunability, catechol-containing molecules improve the dispersion of inorganic nanoparticles such as $TiO_2$ [3]; however, DHB on its own had poor film-forming properties needed for the fabrication of photoelectrodes. CHIT was introduced as a film-forming agent to integrate DHB-modified P25-$TiO_2$ nanoparticles into photoactive electrodes.

Figure 2:
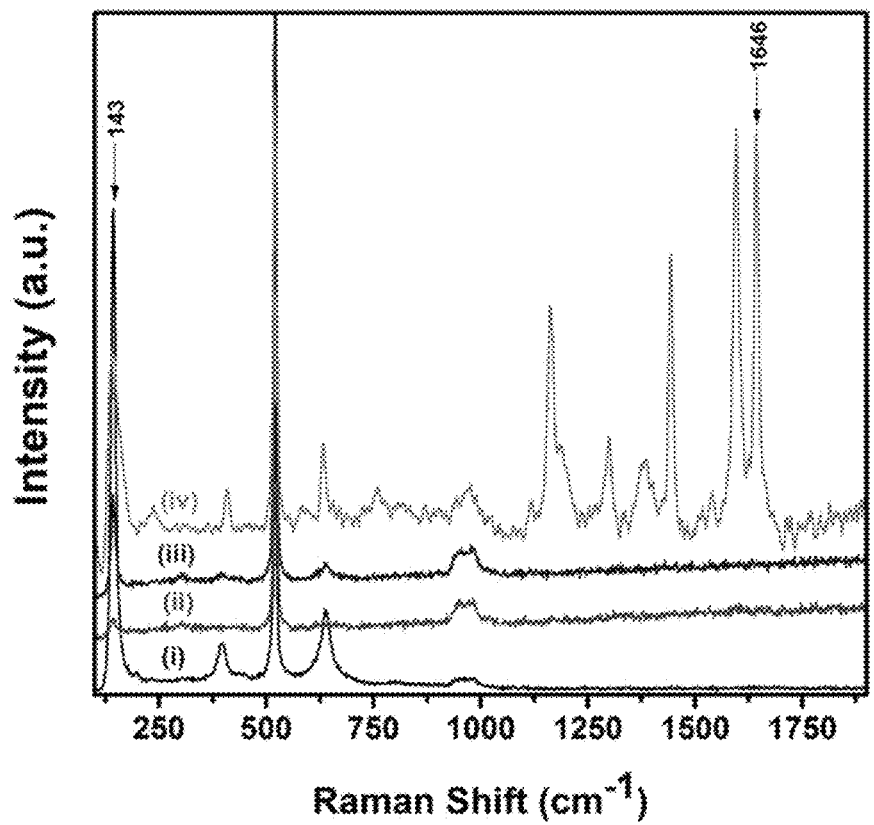

Catechol groups may serve a dual purpose in improving the IPCE of photoelectrodes with P25-$TiO_2$ nanoparticles, especially in the visible range, while also working with CHIT to form a uniform and stable film that can undergo multiple washing and electrochemical scanning steps as encountered in sensing systems. Therefore, a one-step method of introducing catechol to CHIT using DHB was developed based on a Schiff base reaction (FIG. 1a) between DHB and CHIT. The formation of DHB-modified CHIT was confirmed using FTIR (FIG. 1b). In the as-received CHIT spectrum, characteristic absorptions were detected at approximately 1,081, 1,031, and 895 $cm^{-1}$. These absorptions represent the stretching vibrations from the hydroxyl group, the C—O—C in the glucose circle, and the glucoside bond, respectively. Characteristic absorption at approximately 1550 $cm^{-1}$, corresponding to the amide II group, was also visible in the CHIT spectra and the spectra from P25-$TiO_2$ nanoparticles modified with pure CHIT. This confirmed surface modification of P25-$TiO_2$ with CHIT. The 1,081, 1,031, and 895 $cm^{-1}$ absorptions were detected in the spectra of P25-$TiO_2$ modified with the DHB-CHIT ligand. Absorptions at ~1660 and 1295 $cm^{-1}$ from the as-received DHB spectra were also found in the spectra of P25-$TiO_2$ modified with DHB and DHB-CHIT ligands and are attributed to C=O and O—H vibrations from the aldehyde and phenol groups. The weak absorption at ~1640 $cm^{-1}$ in the DHB modified CHIT spectra is indicative of a Schiff base formation and vibrations from the RCH=N—R' bond. The presence of absorptions from the as-received CHIT and DHB spectra in the spectra acquired from P25-$TiO_2$ nanoparticles modified with the DHB-CHIT ligand and characteristic vibrations from RCH=N—R' confirm the formation of a Schiff base ligand between CHIT and DHB. It is known that characteristic bands of Schiff base functional groups are emitted in the range of 1630-1690 $cm^{-1}$, but these bands appear weak in the infrared spectrum and intense in the Raman spectrum. Formation of a Schiff base ligand was further confirmed (FIG. 2) as evidenced by the intense band observed at ~1646 $cm^{-1}$ in the Raman spectra of P25-$TiO_2$-DHB-CHIT, which was not present in the Raman spectra collected from bare P25-$TiO_2$, P25-$TiO_2$—CHIT or P25-$TiO_2$-DHB.

Figure 3:
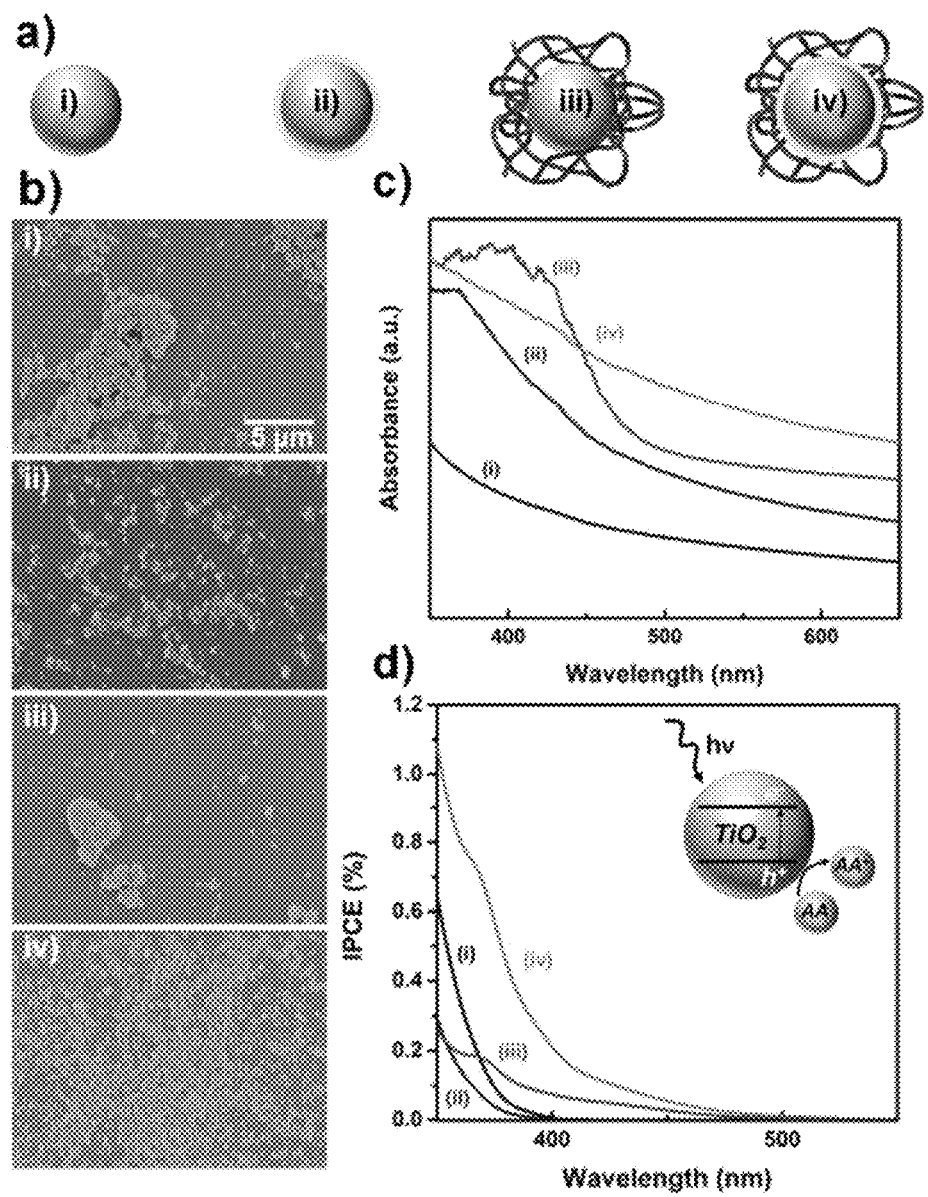

Scanning Electron Microscopy (SEM) was used to compare the surface morphology of photoelectrodes fabricated from unmodified P25-$TiO_2$ nanoparticles with those from functionalized P25-$TiO_2$ nanoparticles (P25-$TiO_2$-DHB, P25-$TiO_2$-CHIT, P25-$TiO_2$-DHB-CHIT) (FIG. 3). The films fabricated from unmodified nanoparticles were non-uniform and contained large P25-$TiO_2$ agglomerates due to weak bonding of the nanoparticles to the electrode surface. The P25-$TiO_2$-DHB films demonstrated a more even film with reduced amount of agglomerates, and the P25-$TiO_2$—CHIT films contained large agglomerates and less surface coverage than unmodified nanoparticles. Lastly, P25-$TiO_2$—CHIT-DHB samples showed marked improvement in the film properties with the P25-$TiO_2$ nanoparticles distributed in a uniform film containing the smallest amount of agglomeration. In the case of CHIT, film formation occurs via hydrogen bonding between Ti—O—Ti inorganic network and CHIT as well as coordination bonding in P25-$TiO_2$—CHIT nanocomposite. This allowed for adhesion of the adjacent P25-$TiO_2$ layers. However, when the amount of P25-$TiO_2$ increased, small agglomerates form. This phenomenon was attributed to the lack of adhesion between P25-$TiO_2$ and CHIT within each layer.

Irradiation of P25-$TiO_2$ with light having energy equal to or greater than its bandgap energy (3.0-3.2 eV) generated electron-holes pairs that participate in redox reactions. Ascorbic acid (AA), a hole scavenger, then combined with photo-generated holes in $TiO_2$ and generates a PEC current through its oxidation at the surface of the working electrode (FIG. 3d-inset). The annihilation of holes by AA resulted in the movement of electrons from the conduction band of the P25-$TiO_2$ to the ITO electrode where it is collected as a measurable current.

Figure 4:
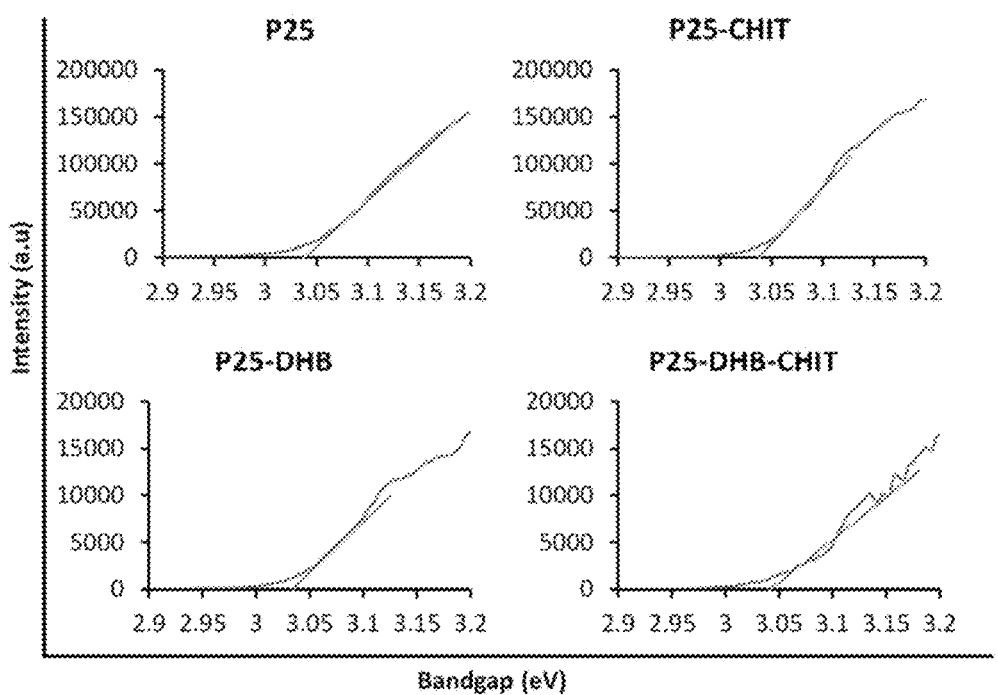

In order to determine the correlation between P25-$TiO_2$ functionalization and PEC response, UV/Visible absorbance (FIG. 3c) and IPCE of the four classes of P25-$TiO_2$ photoelectrodes fabricated using successive deposition of solution-based nanoparticles onto ITO-coated PET electrodes were measured (FIG. 3d). UV-Visible spectroscopy confirmed modification of the electronic structure of P25-$TiO_2$ by CHIT, DHB and DHB-CHIT, since the absorption spectra of the electrodes fabricated using functionalized P25-$TiO_2$ nanoparticles were all shifted to longer wavelengths compared to those fabricated using unmodified P25-$TiO_2$ nanoparticles. Additionally, diffuse reflectance spectroscopy was performed on photoelectrodes fabricated with these different surface functionalizations. Bandgap of 3.04 eV was obtained for all four materials by extrapolating the linear portion of the obtained curves to determine the x-intercept. No significant change in bandgap was seen in either of the functionalizations as compared to bare P25-$TiO_2$ (FIG. 4).

Even though P25-$TiO_2$—CHIT and P25-$TiO_2$-DHB films both demonstrate an enhancement in absorbance across the entire measurement range compared to unmodified P25-$TiO_2$, the IPCE measurements demonstrate that modification of P25-$TiO_2$ with both DHB and CHIT results in a superior photoelectrochemical response across the wavelength range of 350-500 nm. This validates that the synergy between DHB and CHIT in controlling the electronic and film forming properties of P25-$TiO_2$ nanoparticles towards engineering high performance electrodes for PEC. Furthermore, the IPCE of these electrodes was compared to an instance of ligand modified P25-TiO$_2$ in literature [4], where a composite P25-TiO$_2$ film was deposited on a transparent conductor using the doctor blade method. Dopamine (DA) was then modified onto the fabricated electrodes via solution immersion. Unlike the one-pot synthesis method of the present application, this method required specialized machinery and multiple steps for synthesis. Furthermore, IPCE of the DA-P25-TiO$_2$ photoelectrodes indicated a maximum enhancement of ~15% as compared to the unmodified P25-TiO$_2$ photoelectrodes. In contrast, an approximate enhancement of 69% in IPCE of the P25-TiO$_2$-DHB-CHIT photoelectrodes as compared to unmodified P25-TiO$_2$ (FIG. 3d).

Figure 5:
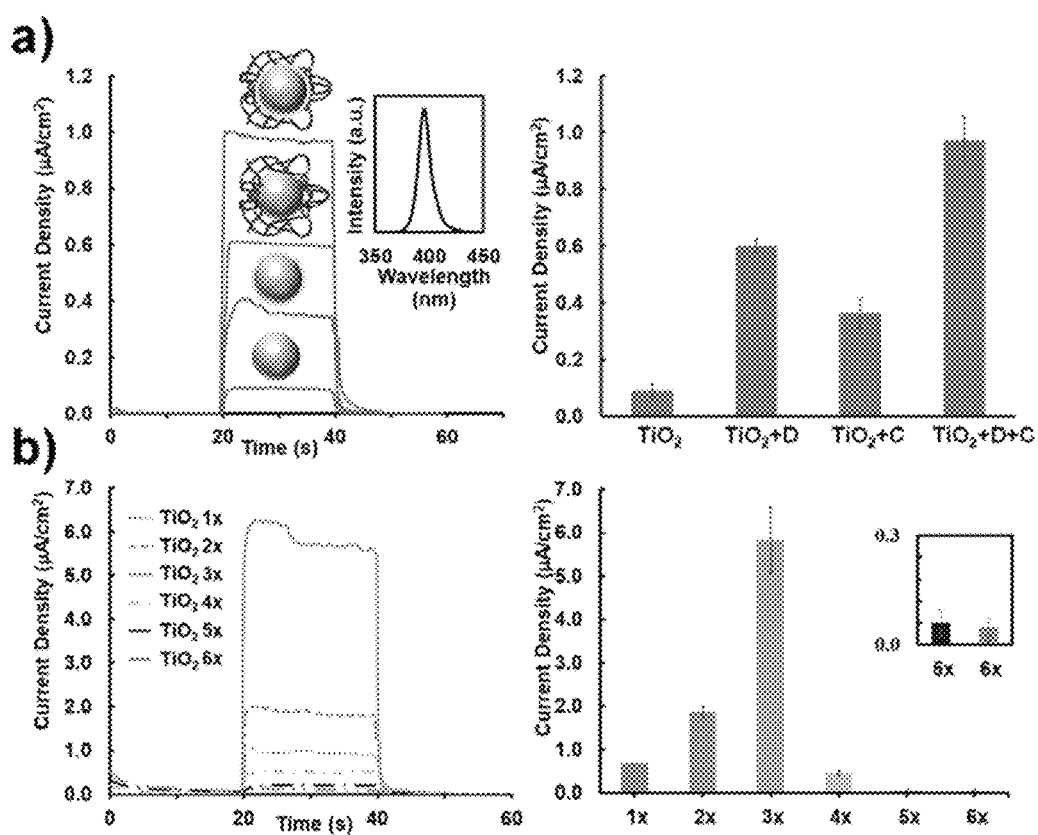

In addition to IPCE, amperometric I-t measurements, a method typically used for photoelectrochemical readout in biosensors, were conducted on the photoelectrodes created using unmodified and functionalized P25-TiO$_2$ nanoparticles (FIG. 5a). In accordance with the IPCE results, the unmodified P25-TiO$_2$ films showed the lowest current density, while P25-TiO$_2$-DHB and P25-TiO$_2$—CHIT showed an increase in PEC current density, respectively. The largest amount of photocurrent was generated by the P25-TiO$_2$-DHB-CHIT photoelectrodes. These photoelectrodes showed more than a 10-fold increase in photocurrent compared to unmodified P25-TiO$_2$.

Without being bound by theory, this order-of-magnitude increase in photocurrent may be the result of increased photon absorption rate, as well as enhanced charge separation and collection rate. The UV/VIS spectroscopy results demonstrated that there is a greater overlap between the emission spectrum of the excitation source (FIG. 5a) and the absorption spectrum of P25-TiO$_2$-DHB-CHIT nanoparticles (FIG. 3c) compared to all other P25-TiO$_2$ films used in this study. Interestingly, even at 350 nm, where all modified P25-TiO$_2$ films demonstrate similar absorptions, films modified with both CHIT and DHB yielded the highest conversion efficiency. This may be due to the improved film uniformity, surface coverage, and contact between the P25-TiO$_2$ and the ITO collector electrodes. Moreover, the micro and nanostructure of the photoelectrode influenced the accessibility of hole scavenging species such as ascorbic acid to the surface of the photoelectrode, which in turn influenced the generated photocurrent. The use of chitosan in conjunction with DHB resulted in a micro/nanoporous material (FIG. 6a), which exhibited enhanced film forming and electronic properties, thereby synergistically enhancing the generated photocurrent.

Figure 7:
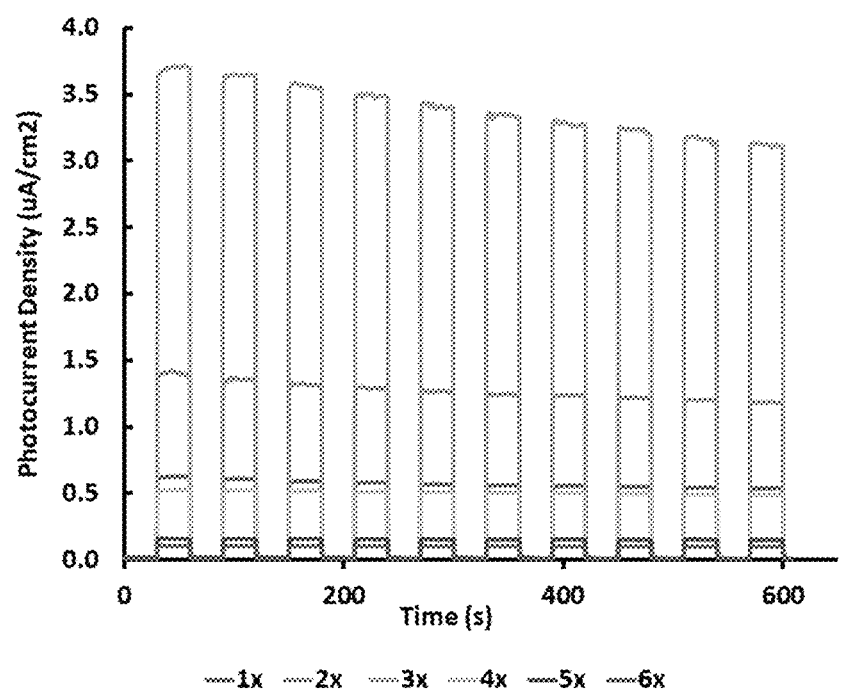
FIG. 7 shows stability measurements of electrodes fabricated with increasing P25-TiO$_2$ concentration of a P25-TiO$_2$-DHB-CHIT film in exemplary embodiments of the application.
Figure 8:
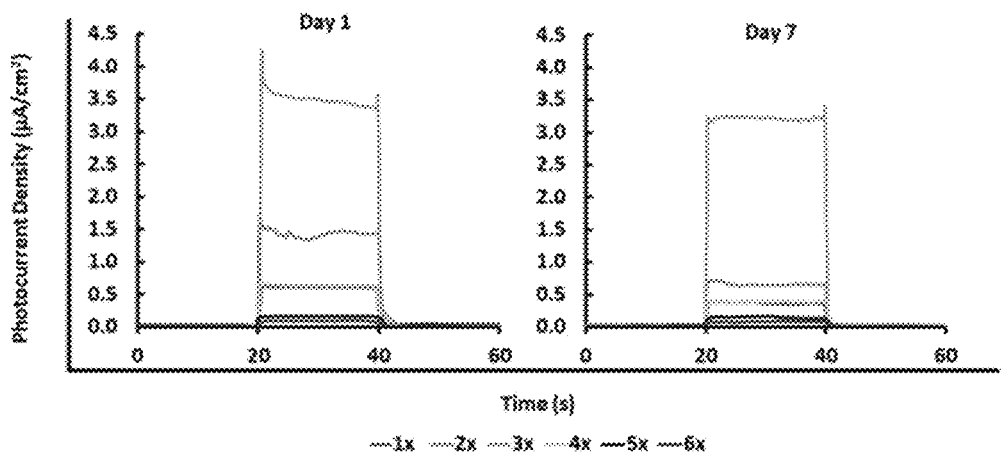
FIG. 8 shows the photocurrent response following storage in dark conditions at 4° C. for 7 days in exemplary embodiments of the application.

To determine the optimal concentration of P25-TiO$_2$ for increasing the photocurrent, PEC experiments were performed at various concentrations of P25-TiO$_2$, while keeping the concentration of DHB and CHIT in the co-functionalized P25-TiO$_2$-DHB-CHIT films constant (FIG. 5b). As the concentration of P25-TiO$_2$ was increased, photocurrent density was enhanced until the P25-TiO$_2$ concentration was tripled. Without being bound by theory, this observed increase in photocurrent was attributed to the presence of a larger population of P25-TiO$_2$ nanoparticles within the same geometric area, which resulted in increased absorption and generation of charge carriers. Furthermore, chopped light amperometry was performed to evaluate the stability of the various photoelectrodes under 10 light excitation cycles in a period of 600 seconds. The relative standard deviation (Rsd) is a widely used statistic to express the precision and repeatability of a measurement and by extension is a measure of stability when applied in the context of photoelectrodes. It was calculated as:

$$Rsd\ \% = \frac{\sigma}{\mu} * 100 \qquad (1)$$

Where σ is the standard deviation and y represents the mean of the sample population. Results indicated good stability in photoelectrodes fabricated by increasing P25-TiO$_2$ concentration from one time up to four times (Rsd of 4.39%, 4.86%, 5.40% and 1.10% respectively) (FIG. 7). However, photoelectrodes formed by increasing the P25-TiO$_2$ concentration by five and six times revealed excellent stability with Rsd of 0.63% and 0.85%, respectively (FIG. 7). Furthermore, a decrease in photocurrent density of ~42.6%, 53.7% and 45.1% was exhibited by photoelectrodes synthesized from 1×, 2× and 3×P25-TiO$_2$ concentrations, while a minimal decrease of ~8.2%, 0.4% and 1.6% was exhibited by 4×, 5× and 6× P25-TiO$_2$ concentrations, respectively, following storage in dark conditions at 4° C. for 7 days (FIG. 8). It is noted, however, that although films created from 3×P25-TiO$_2$ demonstrated the largest PEC response, films with higher P25-TiO$_2$ concentrations may be preferred in applications where long-term stability is desired.

Example 3. PEC Biosensors for DNA Detection

Figure 6:
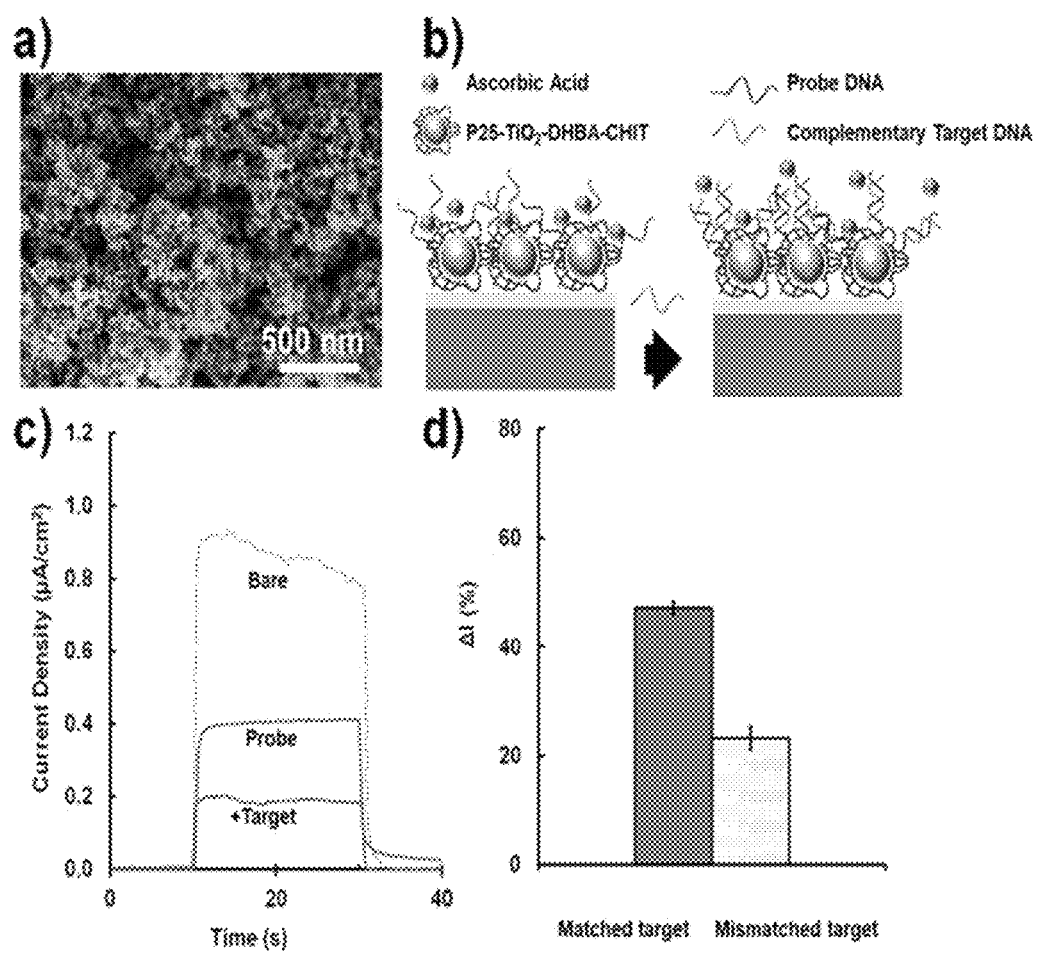

To create a PEC biosensor for detecting DNA hybridization, the biosensor has surfaces that generate PEC currents and selectively capture DNA targets. To introduce DNA capture capability into the TiO$_2$-DHB-CHIT films, amine-terminated DNA was coupled to P25-TiO$_2$-DHB. To increase the density of DNA probes, the DHB concentration was increased to increase the overall binding sites for DNA and CHIT. A PEC assay with an increased amount of DHB (3×) for probe immobilization was employed to distinguish between complementary and non-complementary DNA (FIG. 6). It was expected that an increase in the concentration of DNA at the electrode surface would decrease the PEC current generated from AA oxidation by limiting the access of AA to the electrode surface (FIG. 6b). PEC measurements demonstrated a decrease in current following probe deposition, as well as after incubation with complementary target DNA (FIG. 6c). A larger decrease in PEC current is seen following the introduction of complementary target DNA compared to non-complementary target DNA (FIG. 6d). As only the complementary target DNA sequence hybridized with the DNA probe, a larger decrease was exhibited by the complementary case. Without being bound by theory, this was understood to be due to the increased steric hindrance of AA caused by resulting double stranded DNA. The current decrease observed for the non-complementary sequences was attributed to non-specific adsorption on the photoelectrode surface.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE APPLICATION

[1] Janković, I. A.; Šaponjid, Z. V.; Čomor, M. I.; Nedeljković, J. M. Surface Modification of Colloidal TiO$_2$ Nanoparticles with Bidentate Benzene Derivatives. *J. Phys. Chem. C* 2009, 113 (29), 12645-12652.

[2] Kim, E.; Liu, Y.; Shi, X. W.; Yang, X.; Bentley, W. E.; Payne, G. F. Biomimetic Approach to Confer Redox Activity to Thin Chitosan Films. *Adv. Funct. Mater.* 2010, 20 (16), 2683-2694.

[3] Saraswat, S. K.; Rodene, D. D.; Gupta, R. B. Recent Advancements in Semiconductor Materials for Photoelectrochemical Water Splitting for Hydrogen Production Using Visible Light. *Renew. Sustain. Energy Rev.* 2018, 89, 228-248.

[4] Kim, S.; Moon, G.; Kim, G.; Kang, U.; Park, H.; Choi, W. TiO$_2$ Complexed with Dopamine-Derived Polymers and the Visible Light Photocatalytic Activities for Water Pollutants. 2017, 346, 92-100.

We claim:

1. A photoactive product comprising:
   a catechol-containing compound,
   an amine-containing polymer, and
   a photoactive material,
   wherein the photoactive product has an enhancement in incident photon-to-electron conversion efficiency (IPCE) of at least 50% compared to unmodified photoactive material.

2. The photoactive product of claim 1, wherein the photoactive product is a Schiff base, an amide, and/or a sulfonamide.

3. The photoactive product of claim 1, wherein the catechol-containing compound comprises a catechol-containing compound that has a functional group capable of reacting with the amine group of the amine-containing polymer, wherein the functional group is carbonyl groups, carboxyl groups, sulfonyl groups, amine groups, alkenyl groups, alkynyl groups, or combinations thereof.

4. The photoactive product of claim 1, wherein the catechol-containing compound is selected from 3,4-dihydroxybenzaldehyde (DHB), 3,4-dihydroxyphenylalanine (DOPA), 3,4-dihydroxybenzoic acid (DHBA), 3,4-dihydroxyphenylacetic acid (DHPAA), 3,4-dihydroxyhydrocinnamic acid (DHHCA), 4,5-dihydroxy-1,3-benzenedisulfonic acid (DHBSA), caffeic acid (CA), gallic acid (GA), dopamine (DA), 2,3,4-trihydroxybenzaldehyde (THB), 2,3,4-trihydroxybenzoic acid (THBA), or a combination thereof.

5. The photoactive product of claim 1, wherein the catechol- containing compound is DHB.

6. The photoactive product of claim 1, wherein the amine-containing polymer comprises a homopolymer or copolymer that has at least one amine group, and optionally, the average molecular weight of the amine-containing polymer ranges from 1 kDa to 1000 kDa or from 10 kDa to 500 kDa.

7. The photoactive product of claim 1, wherein the amine-containing polymer comprises chitosan, polylysine, or combinations thereof.

8. The photoactive product of claim 1, wherein the photoactive material comprises photoactive particles, nanomaterial, or a combination thereof, and optionally the photoactive material comprises metal oxide(s), sulfide(s), metal chalcogenide, or a combination thereof, and optionally, the metal oxide(s) are selected from Cd, Zn, In, Pb, Mo, W, Sb, Bi, Cu, Hg, Ti, Ag, Mn, Fe, V, Sn, Zr, Sr, Ga, Si, Cr, a perovskite such as SrTiO$_3$ or CaTiO$_3$, or a combination thereof, wherein the sulfide(s) are selected from CdS, ZnS, In$_2$S$_3$, PbS, Mo$_2$S, WS$_2$, Sb$_2$S$_3$, Bi$_2$S$_3$, ZnCdS$_2$, Cu$_2$S, or a combination thereof; or the metal chalcogenide is selected from CdSe, In$_2$Se$_3$, WSe$_2$, HgS, PbSe, CdTe or a combination thereof.

9. The photoactive product of claim 1, wherein the photoactive material comprises metal(s), metal oxide(s), semiconductor material(s), carbon-based material(s), conductive polymer(s), photoactive polymer(s), plasmonic material(s), dye(s), or a combination thereof, optionally, the photoactive material comprises metal oxide(s), sulfide(s), metal chalcogenide, or a combination thereof, and optionally the metal oxide(s) are selected from Cd, Zn, In, Pb, Mo, W, Sb, Bi, Cu, Hg, Ti, Ag, Mn, Fe, V, Sn, Zr, Sr, Ga, Si, Cr, a perovskite such as SrTiO$_3$ or CaTiO$_3$, or a combination thereof, wherein the sulfide(s) are selected from CdS, ZnS, In$_2$S$_3$, PbS, Mo$_2$S, WS$_2$, Sb$_2$S$_3$, Bi$_2$S$_3$, ZnCdS$_2$, Cu$_2$S, or a combination thereof, and the metal chalcogenide is selected from CdSe, In$_2$Se$_3$, WSe$_2$, HgS, PbSe, CdTe or a combination thereof.

10. The photoactive product of claim 1, wherein the photoactive material comprises titanium dioxide, zinc oxide, iron oxide, cadmium sulfide, cadmium telluride, or a combination thereof, and optionally, the photoactive material comprises titanium dioxide, and optionally, the titanium dioxide has a crystal structure that is at least one of anatase, rutile and brookite, or the titanium dioxide is P25-TiO$_2$.

11. The photoactive product of claim 1, wherein the catechol-containing compound and the amine-containing polymer are in a mole ratio of from about 1:1 to 5:1.

12. The photoactive product of claim 1, wherein the photoactive product has an enhancement in IPCE of at least 70% compared to unmodified photoactive material.

13. The photoactive product of claim 1, wherein the photoactive product further comprises biomolecule(s) or synthetic analog(s), and optionally, the biomolecule(s) or synthetic analog(s) thereof are selected from oligonucleotide(s), oligopeptide(s), antibodie(s), aptamer(s), DNAzyme(s), molecular imprinted polymer(s), oligosaccharide(s), or a combination thereof, and optionally, the biomolecule(s) comprise oligonucleotide(s).

14. The photoactive product of claim 13, wherein the catechol-containing compound is coupled to the amine-containing polymer to form a first product, and the catechol-containing compound is coupled to the biomolecule(s) or synthetic analog(s) to form a second product.

15. The photoactive product of claim 14, wherein the second product is a Schiff base, an amide, and/or a sulfonamide.

16. The photoactive product of claim 1, wherein the photoactive product is a photocatalyst.

17. A method for making a photoactive product of claim 13, the method comprising: i) combining the catechol-containing compound, the amine-containing polymer, and the biomolecule(s) or synthetic analog(s) to form a first product and the a second product, wherein the first product comprises the catechol-containing compound and the amine-containing polymer and the second product comprises the catechol-containing compound and the biomolecule(s) or synthetic analog(s); and ii) combining the first product and the second product with the photoactive material to form the photoactive product, and optionally, there is a higher concentration of the catechol-containing compound compared to the amine-containing polymer and the biomolecule(s) or synthetic analog(s) in i), and optionally, the catechol-containing compound, the amine-containing polymer, and the biomolecule(s) or synthetic analog(s) thereof are in a mole ratio of from 1:1:1 to 5:1:1.

18. A photoelectrode comprising the photoactive product of claim 1, optionally further comprising a conductive substrate, and optionally, the conductive substrate has at least one layer comprising the photoactive product, wherein the at least one layer is optionally, at least one film.

19. The photoelectrode of claim 18, wherein the conductive substrate comprises metal, glass, polymer or a combination thereof, and optionally, the conductive substrate comprises non-conductive glass or polymer and a conductive material, wherein the conductive material is selected from indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof and the polymer is selected from polyethylene terephthalate (PET), polyethylene naphthalate (PEN), polyimide (PI), or a combination thereof.

20. A method for making the photoelectrode of claim 18, the method comprising depositing the at least one layer on the conductive substrate, and optionally, wherein a solution comprising the photoactive product is deposited on the conductive substrate forming a single layer or multi-layer, optionally, the depositing comprises dip coating, spray coating, drop casting, such as layer by layer drop casting, spin coating, electrophoretic deposition, vapor deposition, sputtering deposition, coating or chemical vapor deposition (CVD), aerosol deposition (AD) method, or a combination thereof.

21. The method of claim 20, wherein the conductive substrate is activated, such as via oxidation, prior to deposition of the at least one layer.

22. A photoelectrode made by the method of claim 20.

23. A device comprising the photoactive product of claim 1, wherein optionally, the device is a biosensor.

24. A device comprising the photoelectrode of claim 18.

25. A biosensor for detecting at least one analyte comprising the photoelectrode of claim 18, wherein the photoactive product further comprises the biomolecule(s) or synthetic analog(s), and optionally, the biomolecule(s) or synthetic analog(s) thereof are selected from oligonucleotide(s), oligopeptide(s), antibodie(s), aptamer(s), DNAzyme(s), molecular imprinted polymer(s), oligosaccharide(s), or a combination thereof, optionally, the biomolecule(s) comprising oligonucleotide(s).

26. The biosensor of claim 25, wherein binding of the at least one analyte results in a change in signal, such as a change in photoelectrochemical current, potential, and/or impedance.

27. The biosensor of claim 25, wherein the analyte is a biologically-relevant target, and optionally, the biologically-relevant target is a nucleic acid.

* * * * *